US008390839B2

(12) United States Patent
Tomita

(10) Patent No.: US 8,390,839 B2
(45) Date of Patent: Mar. 5, 2013

(54) IMAGE FORMATION SYSTEM, INFORMATION PROCESSOR, AND COMPUTER-READABLE RECORDING MEDIUM TO SELECT APPARATUS FOR EXECUTING PROCESS

(75) Inventor: Atsushi Tomita, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1247 days.

(21) Appl. No.: 11/483,771

(22) Filed: Jul. 11, 2006

(65) Prior Publication Data

US 2007/0188792 A1 Aug. 16, 2007

(30) Foreign Application Priority Data

Feb. 10, 2006 (JP) ................................. 2006-034151

(51) Int. Cl.
G06F 3/12 (2006.01)
G06F 15/00 (2006.01)
G06K 1/00 (2006.01)
(52) U.S. Cl. ...................... 358/1.15; 358/1.9; 358/1.13
(58) Field of Classification Search ........................... None
See application file for complete search history.

(56) References Cited

U.S. PATENT DOCUMENTS

| 6,407,823 | B1 * | 6/2002 | Aoki | 358/1.15 |
|---|---|---|---|---|
| 7,019,861 | B2 * | 3/2006 | Aagesen | 358/1.15 |
| 7,602,514 | B2 * | 10/2009 | Levin et al. | 358/1.15 |
| 2002/0010731 | A1 * | 1/2002 | Bergs et al. | 709/102 |
| 2002/0054019 | A1 * | 5/2002 | Rosenberg et al. | 345/157 |
| 2003/0086119 | A1 * | 5/2003 | Nagasaka | 358/1.15 |
| 2004/0184069 | A1 * | 9/2004 | Mifune | 358/1.15 |
| 2005/0055641 | A1 | 3/2005 | Machida | |
| 2006/0103872 | A1 * | 5/2006 | Shimogori | 358/1.15 |

FOREIGN PATENT DOCUMENTS

| JP | 06-324823 | 11/1994 |
|---|---|---|
| JP | 8-328776 | 12/1996 |
| JP | 11-095940 | 4/1999 |
| JP | 11-175295 | 7/1999 |
| JP | 11-188930 | 7/1999 |
| JP | 2000-156760 | 6/2000 |
| JP | 2000-200164 | 7/2000 |
| JP | 2000-315182 | 11/2000 |
| JP | 2001-249781 | 9/2001 |
| JP | 2002-199153 | 7/2002 |
| JP | 2005-044024 | 2/2005 |

OTHER PUBLICATIONS

Final Decision for Rejection in JP 2006-034151 dated Jan. 13, 2009, and an English Translation thereof.

* cited by examiner

*Primary Examiner* — Ming Hon
(74) *Attorney, Agent, or Firm* — Buchanan Ingersoll & Rooney PC

(57) ABSTRACT

In an image formation system, an information processor stores, for each type of document, information related to the performance of each image formation apparatus to process a document. When a document to request processing by an image formation apparatus is selected, the information processor notifies of information related to performance of an image formation apparatus for each type of a relevant document.

16 Claims, 13 Drawing Sheets

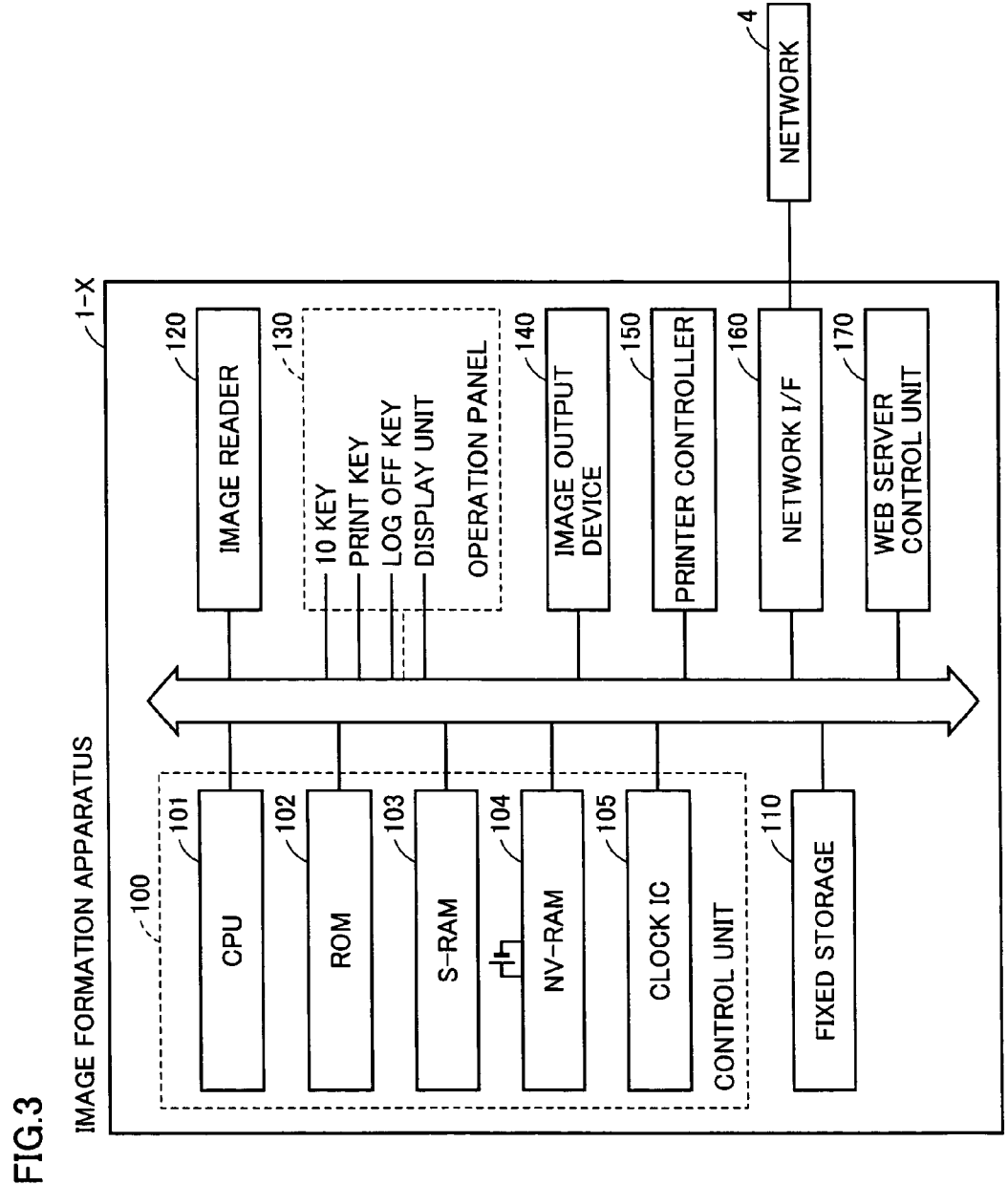

IMAGE FORMATION SYSTEM, INFORMATION PROCESSOR, AND COMPUTER-READABLE RECORDING MEDIUM TO SELECT APPARATUS FOR EXECUTING PROCESS

This application is based on Japanese Patent Application No. 2006-034151 filed with the Japan Patent Office on Feb. 10, 2006, the entire content of which is hereby incorporated by reference.

BACKGROUND OF THE INVENTION

1. Field of the Invention

The present invention relates to an image formation system, an information processor, and a computer-readable recording medium. Particularly, the present invention relates to an image formation system, an information processor, and a computer-readable recording medium to select an image formation apparatus that is to execute a process in an image formation system constituted of at least one image formation apparatus and at least one information processor connected to each other via a network.

2. Description of the Related Art

In an image formation system having one or more image formation apparatuses and one or more information processors connected to each other via a network, there are known various approaches and methods to select an image formation apparatus for processing when a document is to be transmitted from a certain information processor.

Print data that is the subject of processing by the image formation apparatus is generated by a printer driver installed in, for example, an information processor. The printer driver generates print data to be transmitted to the image formation apparatus.

Specifically, the printer driver converts a plotting instruction issued by an operating system or an application program of an information processor into page description language that can be processed by the image formation apparatus, and transfers the plotting instruction defined in page description language to the image formation apparatus.

Reflecting the significant improvement in performance of information processors, the processing time may be reduced by generating a bit map image at the information processor. In view of the foregoing, some printer drivers transfer the plotting instruction issued by the operating system or application program of the information processor into a bit map image and then transmit the same to the image formation apparatus.

Japanese Laid-Open Patent Publication No. 08-328776 discloses the approach of transferring predetermined print data to an image formation apparatus by a plurality of printer drivers to virtually execute processing in order to select the optimum printer driver by comparing the length of the processing time required for execution. This approach allows the printer driver with a short processing time to be selected without having to cause the image formation apparatus to actually execute the printing process.

Japanese Laid-Open Patent Publication No. 2002-199153 discloses the approach of allowing the user to identify which image formation apparatus is appropriate for execution of processing. Specifically, in the case where the image formation apparatus selected to conduct a certain process is absent of the capability required to execute the certain process, that selected image formation apparatus searches for another image formation apparatus in the system that is capable of executing that certain process, and provides a message about an image formation apparatus capable of processing, if any, on the display.

Some of the recent image formation apparatuses may have the so-called direct print function incorporated. This direct print function allows documents in the PDF (Portable Document Format) or TIFF (Tagged Image File Format) to be directly received and processed without having to be converted into a plotting instruction defined in page description language by the printer driver or to be transferred into a bit map image.

In such an image formation apparatus with the direct print function, the user can instruct the image formation apparatus to directly print out the relevant document by dragging and dropping a displayed icon corresponding to the document that is to be printed out to the displayed icon corresponding to the image formation apparatus.

However, there may be some image formation apparatuses constituting the system that does not accommodate all the file formats including the difference in version.

Further, even if the image formation apparatus corresponds to the file formats, it is expected that the processing capability with respect to each file format will differ for every image formation apparatus. For example, when the user designates a certain image formation apparatus to execute direct printing in view of favorable operability, it is possible that the time required for execution will be unexpectedly time-consuming.

SUMMARY OF THE INVENTION

In view of the foregoing, an object of the present invention is to allow the user to appropriately determine which image formation apparatus in an image formation system is to be selected for execution of print processing while maintaining favorable operability for the user in the image formation system.

According to an aspect of the present invention, an image processing system includes at least one image formation apparatus and at least one information processor connected to each other. The information processor includes a performance information storage unit storing, for each type of document, performance information related to the performance of each image formation apparatus to process a document, a document selection unit selecting a document of which processing by the image formation apparatus is to be requested, a detection unit detecting the type of the document selected by the document selection unit, a performance information acquisition unit obtaining performance information on at least one image formation apparatus stored in the performance information storage unit for the type of document detected by the detection unit, and a notification unit notifying of the performance information obtained by the performance information acquisition unit.

An information processor of the present invention is connected to at least one image formation apparatus, and includes a performance information storage unit storing, for each type of document, performance information related to performance of each image formation apparatus to process a document, a document selection unit selecting a document of which processing by the image formation apparatus is to be requested, a detection unit detecting the type of the document selected by the document selection unit, a performance information acquisition unit obtaining performance information on at least one image formation apparatus stored in the performance information storage unit for the type of the document detected by the detection unit, and a notification unit notifying of the performance information obtained by the performance information acquisition unit.

A computer-readable recording medium has a control program recorded to control an information processor connected to at least one image formation apparatus according to the present invention. The control program causes the information processor to execute the steps of: selecting a document of which processing by the image formation apparatus is to be requested; detecting the type of the document selected; obtaining performance information on at least one image formation apparatus stored in a performance information storage unit that stores, for each type of document, performance information related to performance of each image formation apparatus to process a document, for the type of document detected; and notifying of the obtained performance information.

In accordance with the present invention, the user is provided with information related to the performance of an image formation apparatus for processing a document (performance information), before the user requests processing such as printing out that document by that image formation apparatus.

Accordingly, the user can request the image formation apparatus of a process such as printing out a document after obtaining information related to the performance of the image formation apparatus for the document that is the subject of processing. This obviates the event of having to wait unexpectedly for a long period of time when an image formation apparatus is set to execute processing of a document.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 schematically shows the internal elements of an image formation apparatus constituting the image formation system of FIG. 1.

DESCRIPTION OF THE PREFERRED EMBODIMENTS

An image formation system identified as an example of the present invention will be described hereinafter with reference to the drawings.

Figure 1:
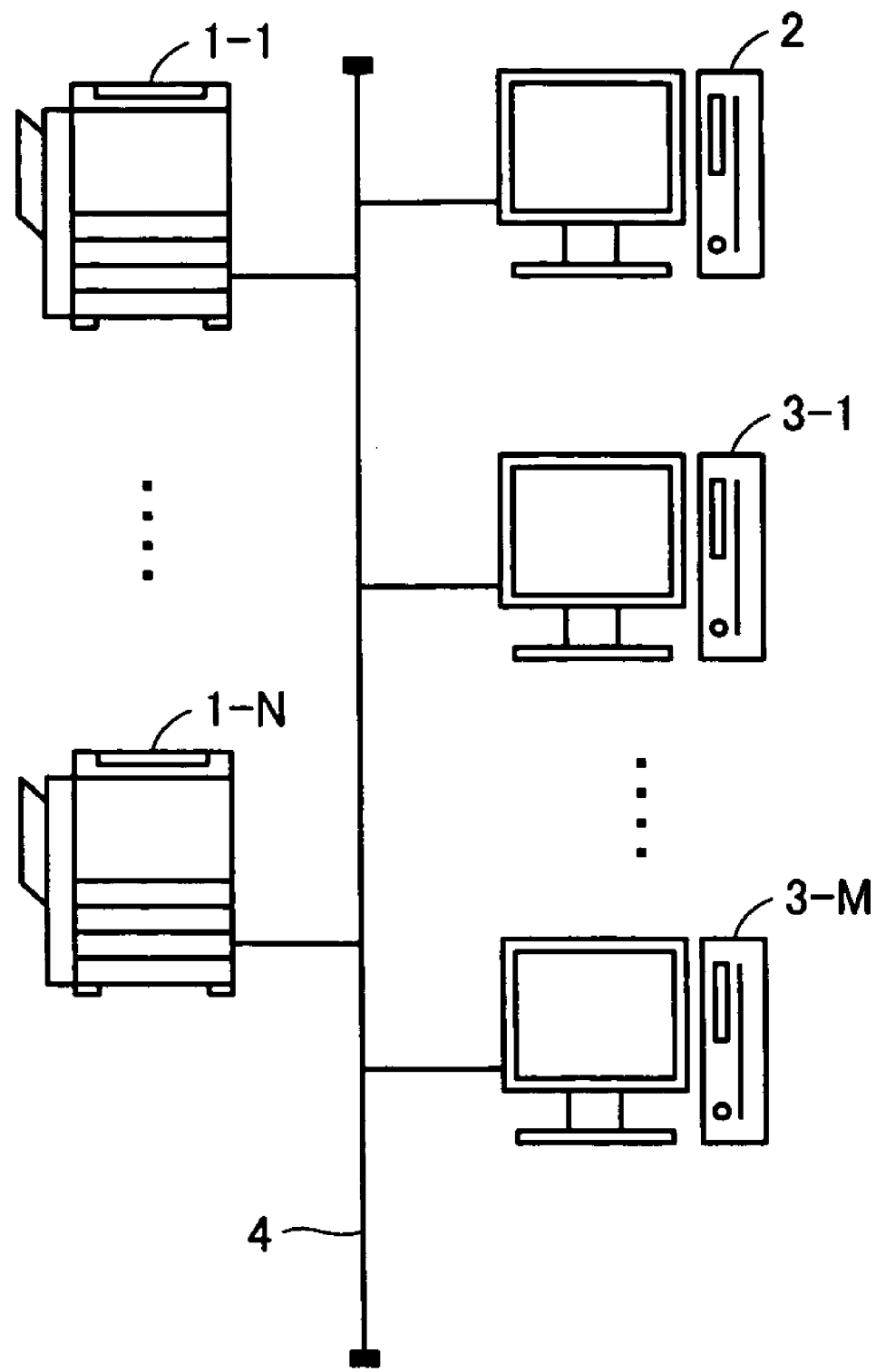
FIG. 1 schematically shows a configuration of an image formation system according to an embodiment of the present invention.

Referring to FIG. 1, an image formation system includes N (N is an arbitrary integer) image formation apparatuses 1-1 to 1-N, an information processor 2, and M (M is an arbitrary integer) information processors 3-1 to 3-M. All these apparatuses are connected on a network 4.

Network 4 may be a network utilizing a dedicated line such as an LAN (Local Area Network), a network utilizing a public network, or a wireless network.

Image formation apparatus 1-X (X=1 to N) forms, on a sheet, a document image read out on its own, or a duplicate of an image generated from print data transmitted from an information processor 3-Y (Y=1 to M).

Print data may be a plotting instruction in page description language, i.e. a plotting instruction issued by the operating system or application program of information processor 3-Y converted into page description language that can be processed by image formation apparatus 1-X, a bit map having a plotting instruction issued by an operating system or application program transferred into a bit map image, or a document file per se such as in PDF or TIFF.

Image formation apparatus 1-X can transmit image data obtained by reading out a document image to information processor 3-Y or to another image formation apparatus in the image formation system via network 4.

Figure 2A:
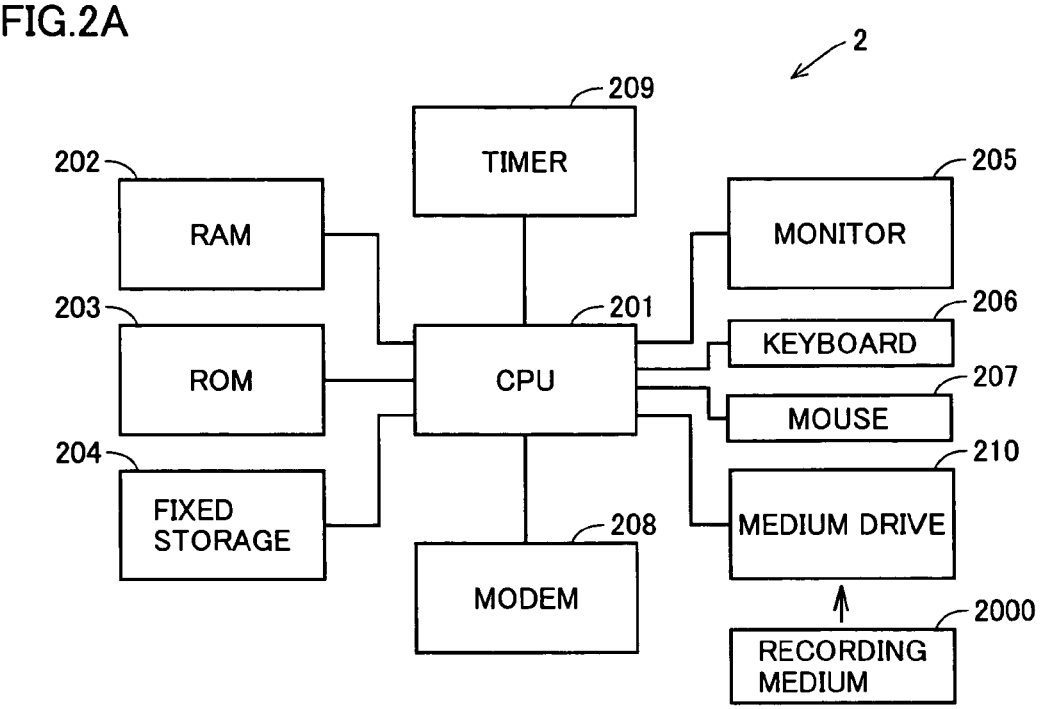
FIGS. 2A and 2B schematically show the internal elements of information processors constituting the image formation system of FIG. 1.
Figure 2B:
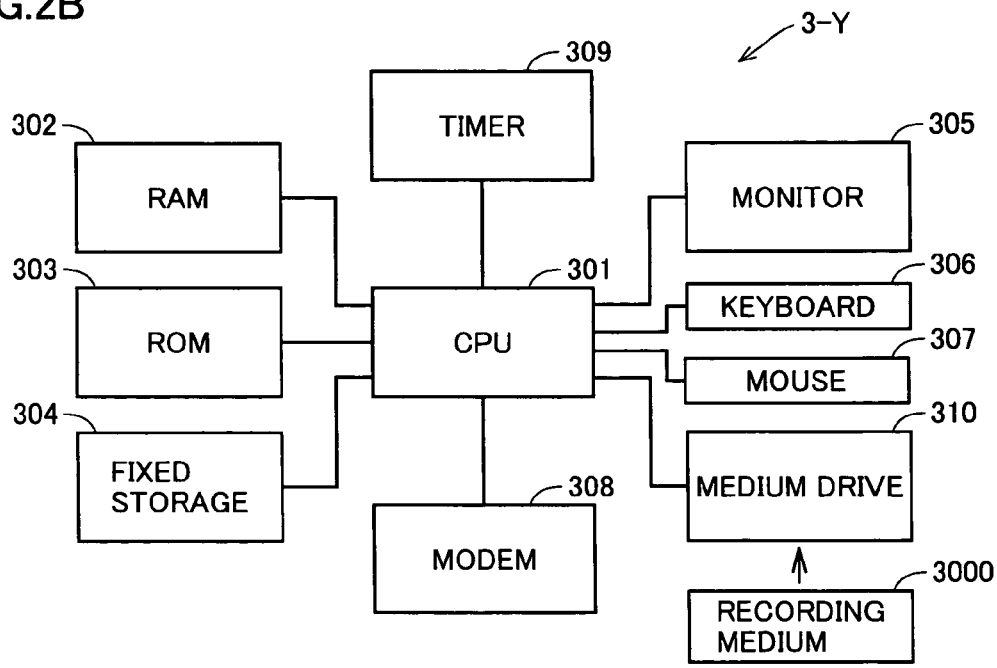

Information processor 2 and information processor 3-Y are formed of general computer devices including, as shown in FIGS. 2A and 2B, respectively, CPUs 201 and 301, RAMs (Random Access Memory) 202 and 302, ROMs (Read Only Memory) 203 and 303, fixed storages (HDD (Hard Disk Drive) and the like) 204 and 304, monitors 205 and 305, keyboards 206 and 306, mouses 207 and 307, modems 208 and 308, timers 209 and 309, media drives 210 and 310 and the like.

Information processor 3-Y responds to an instruction from the user to generate print data and transmit the generated print data to image formation apparatus 1-X.

Referring to FIG. 3, image formation apparatus 1-X includes a control unit 100, a fixed storage 110, an image reader 120, an operation panel 130, an image output device 140, a printer controller 150, a network interface (network I/F) 160, and a Web server control unit 170.

Control unit 100 includes a CPU 101, a ROM 102, an S-RAM (Static Random Access Memory) 103, an NV-RAM (nonvolatile memory) 104, and a clock IC (Integrated Circuit) 105. CPU 101 executes a control program stored in ROM 102. S-RAM 103 is used as a work memory. Various settings related to image formation are stored in NV-RAM 104 that is backed up by a battery.

Image reader 120 for reading out a document image, operation panel 130 including keys and a display for various entry by the user, network I/F 160 for transferring various information with respect to an external apparatus such as information processor 3-Y connected on network 4, printer controller 150 generating a duplicate image from print data received via network I/F 160, and image output device 140 for forming a duplicate image on a sheet are connected to control unit 100, each through a bus. Further, fixed storage 110 is connected to control unit 100 via a bus. Fixed storage 110 is, for example, an HDD.

The process executed by image formation apparatus 1-X in the image formation system of FIG. 1 will be described hereinafter with reference to the flow chart of FIG. 4 that corresponds to a main routine executed by CPU 101 of image formation apparatus 1-X.

Figure 4:
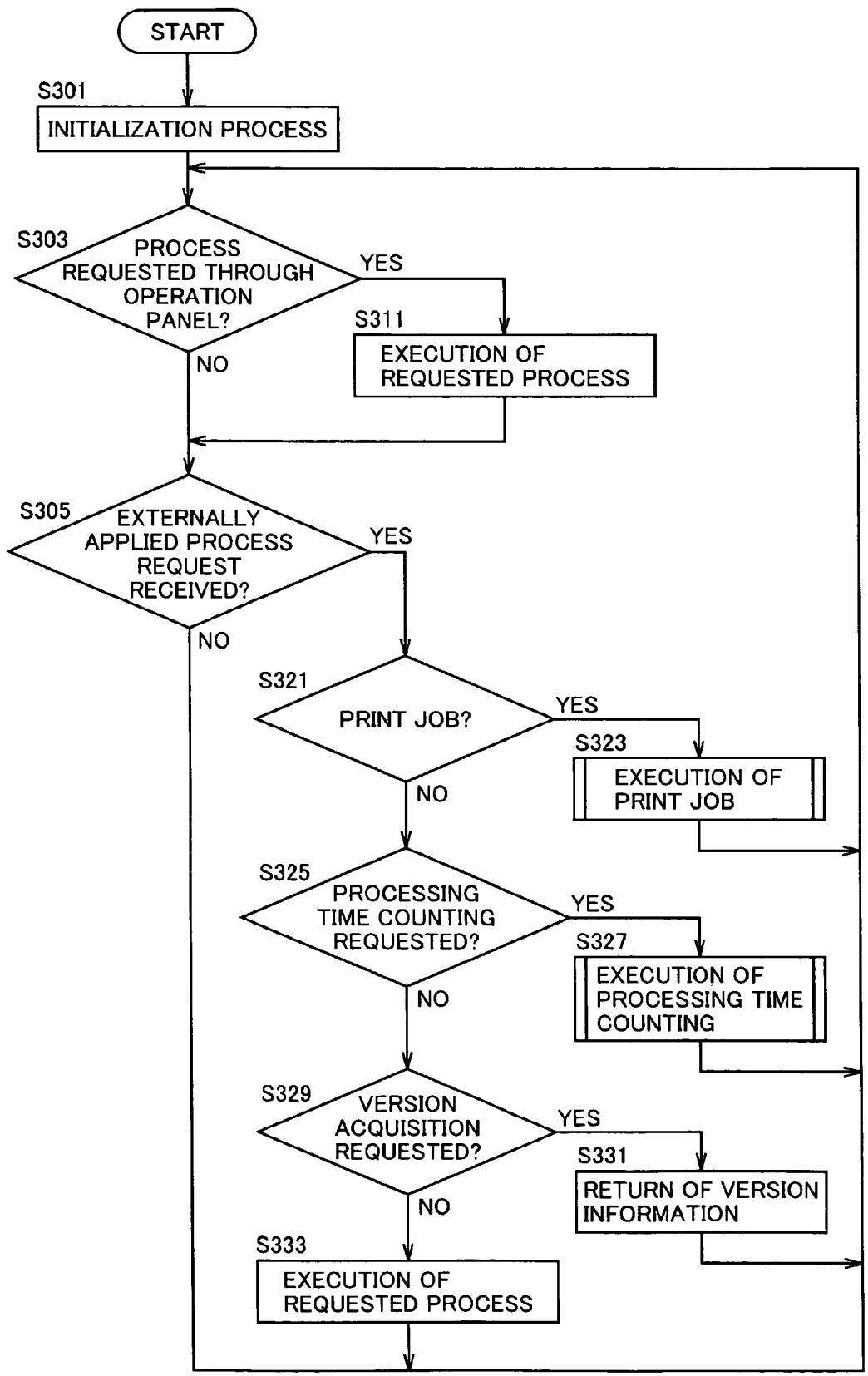
FIG. 4 is a flow chart of a main routine executed by a CPU (Central Processing Unit) of the image formation apparatus of FIG. 3.

Referring to FIG. 4, the main routine starts by the power of image formation apparatus 1-X being turned on. At step S301, CPU 101 executes an initialization process such as clearing the memory, setting the standard mode, and the like.

At step S303, CPU 101 identifies whether any process has been requested as a result of an entry made by the user on the key switch group and display on operation panel 130 of image formation apparatus 1-X. A process requested at this stage includes, for example, the process of scanning and copying a document, and modifying various settings stored in NV-RAM 104. CPU 101 proceeds to step S311 when determination is made of such a request, otherwise, proceeds to step S305.

At step S311, CPU 101 executes the requested process, and proceeds to step S305.

At step S305, CPU 101 determines whether a request of processing has been issued from an external apparatus. When a request of processing is issued, i.e. information requesting a process is received, control proceeds to step S321, otherwise, control proceeds to step S303.

At step S321, CPU 101 determines whether the externally applied request of processing is a print job request or not. When the request corresponds to a print job, control proceeds to step S323 to execute a print job. Then, control returns to step S303. The processing contents executed in the print job at step S323 will be described afterwards with reference to FIG. 5. When determination is made that the externally applied request does not correspond to a print job at step S321, CPU 101 proceeds to step S325.

At step S325, CPU 101 determines whether the external processing request corresponds to processing time counting. If the external request corresponds to processing time counting, control proceeds to step S327 to execute a processing time counting process. Then, control returns to step S303. A processing time counting request is recognized by, when PJL (Print Job Language), for example, that is the general language to control a print job is employed, a description indicating a processing time counting request such as "@PJL SET MEASUREPROCESSTIME=ON" in the print data. The contents of the processing time counting process of step S327 will be described afterwards with reference to FIG. 6. When determination is made that the external processing request does not correspond to a processing time counting request at step S325, CPU 101 proceeds to step S329.

At step S329, CPU 101 determines whether the external processing request corresponds to obtaining the version of the firmware of the image formation apparatus. When YES at step S329, control proceeds to step S331 to execute the process of returning the version information. Then, control returns to step S303. At image formation apparatus 1-X, the firmware version information is stored in, for example, NV-RAM 104. The firmware version can be obtained employing an SNMP (Simple Network Management Protocol) that is the general management protocol of a network apparatus. When determination is made that the external processing request does not correspond to a processing time counting request at step S329, CPU 101 proceeds to S333.

At step S333, CPU 101 executes a process requested by an external apparatus. Then, control returns to step S303. The process executed at step S333 includes, for example, the process of modifying various settings stored in NV-RAM 104.

The print job execution process carried out at step S323 will be described hereinafter with reference to the flow chart of FIG. 5 corresponding to a subroutine thereof.

Figure 5:
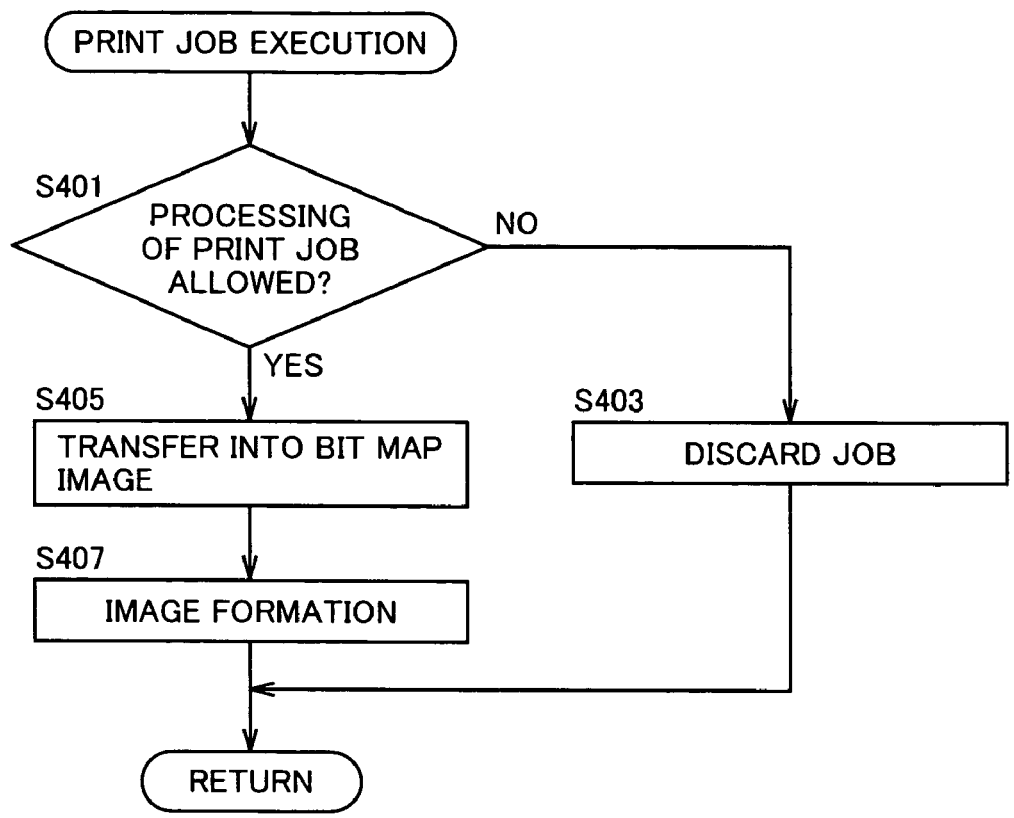
FIG. 5 is a flow chart of a subroutine of a print job execution process of FIG. 4.

In accordance with the print job execution process of FIG. 5, reception of a print job from an external apparatus such as information processor 3-Y causes CPU 101 to determine whether the received print job is a job for a document that can be processed on its own at step S401. When YES at step S401, control proceeds to step S405, otherwise, control proceeds to step 403 where the received print job is discarded and control returns to the main routine.

At step S405, CPU 101 transfers the print data included in the received print job into a bit map image with S-RAM 103 or the like.

At step S407, CPU 101 conducts image formation based on the transferred bit map image. Then, control returns to the main routine.

Figure 6:
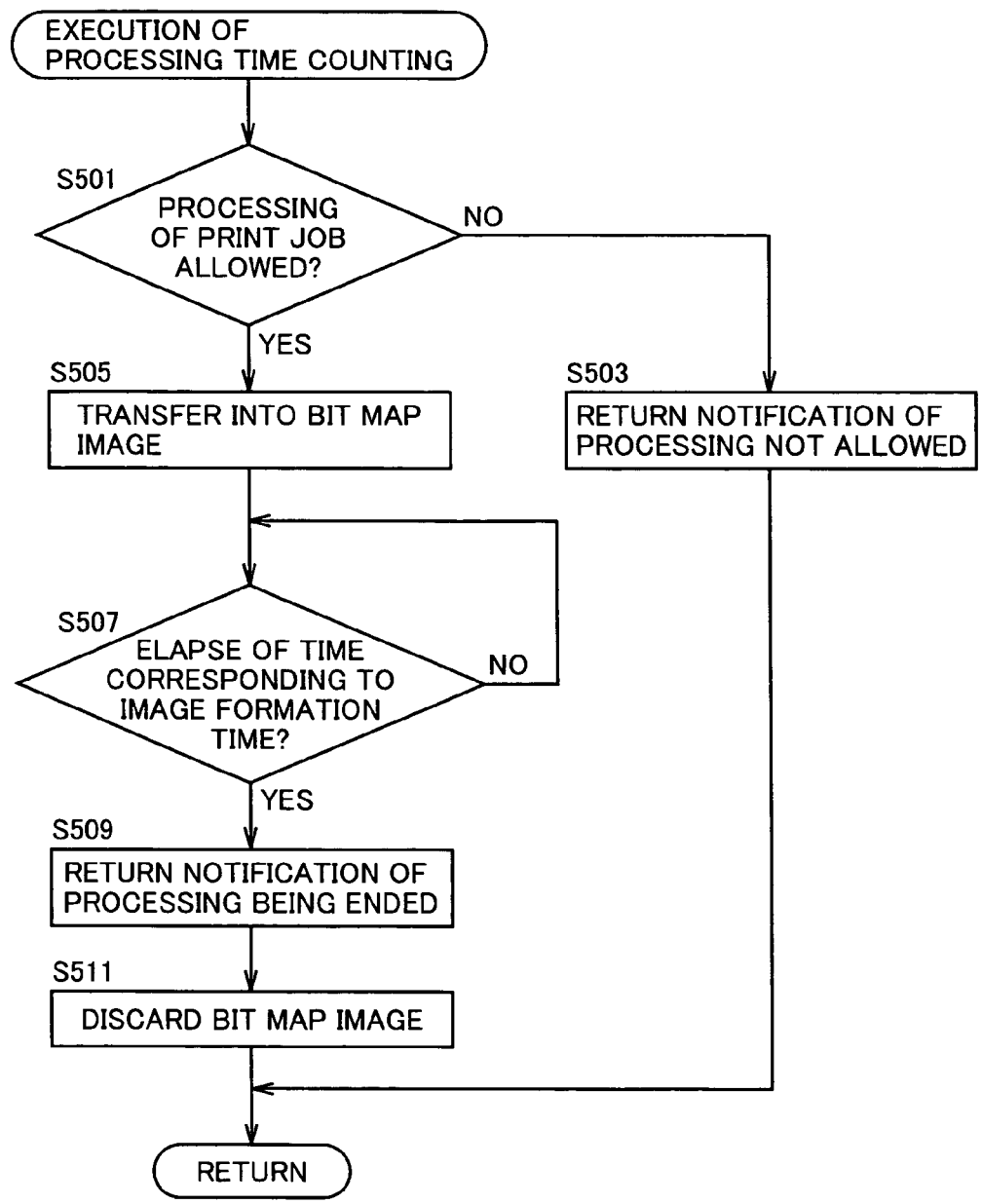
FIG. 6 is a flow chart of a subroutine of a process for processing time counting execution of FIG. 4.

The processing time counting execution process of step S327 (refer to FIG. 4) will be described hereinafter with reference to the flow chart of FIG. 6 corresponding to a subroutine thereof.

Upon receiving information requesting processing time counting from an external source, CPU 101 determines whether the print job that is the subject of the counting request can be processed on its own. When YES at S501, control proceeds to step S505, otherwise, control proceeds to step S503. At step S503, information indicating that the print job of interest cannot be processed on its own is returned towards the apparatus that has transmitted the processing time counting request. Then, control returns to the main routine.

At step S505, CPU 101 transfers the print data included in the print job of interest into a bit map image with S-RAM 103.

When transfer into a bit map image has been completed, CPU 101 stands by for a period of time required for image formation at step S507. The time required for image formation is calculated as set forth below. In the case of an image formation apparatus that is capable of forming an image of 30 pages per minute, the time required to form an image of one page is 2 seconds in average. Therefore, the time required for image formation is 2 seconds× number of pages of the bit map image.

Following the standby for the period of time required for image formation, CPU 101 transmits (returns) at step S509 information indicating that the process has ended to the apparatus that has transmitted the processing time counting request.

At step S511, CPU 101 discards the bit map image transferred at step S505, and returns to the main routine.

Figure 7:
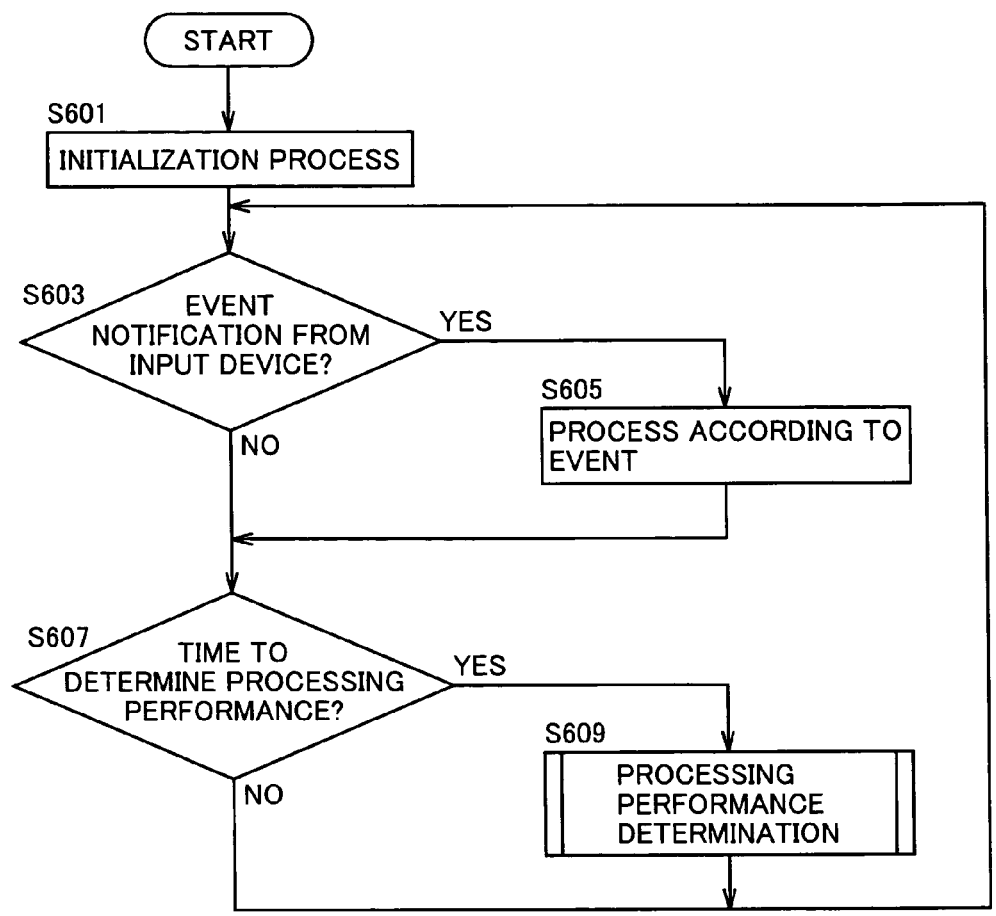
FIG. 7 is a flow chart of a main routine executed by the CPU of the information processor shown in FIG. 2A.

The process executed at information processor 2 will be described hereinafter with reference to the flow chart of FIG. 7 corresponding to the main routine executed by CPU 201 of information processor 2.

In response to the power of information processor 2 being turned on, CPU 201 executes at step S601 an initialization process such as clearing the memory, setting the standard mode, starting an operating system, and the like.

At step S603, CPU 201 determines whether an event has been generated by an operation to the input device (mouse 207 and keyboard 206) of information processor 2. When determination is made that an event has been generated, CPU 201 proceeds to step S605 to execute a process corresponding to the generated event. Then, control proceeds to step S607. When determination is made that an event has not been generated at step S603, CPU 201 proceeds to step S607.

At step S607, CPU 201 determines whether the time has come to determine the processing performance of image formation apparatus 1-X connected through network 4. The information related to the time to determine the processing performance is prestored in RAM 202 or fixed storage 204, and can be set to the time of elapse of a predetermined period from the previous determination, or a predetermined day at every week, or a predetermined day at every month. The timing can be modified by appropriate operation through keyboard 206 and/or mouse 207. When CPU 201 determines that the time has come, the processing performance is determined at step S609. Then, control returns to step S603. When CPU 201 determines that the time has not come, control returns to step S603 without executing the process of step S609.

The contents of the processing performance determination process executed at step S609 will be described hereinafter with reference to the subroutine of FIG. 8 corresponding to the present process. In order to identify each image formation apparatus in the image formation system in the following, a variable i (i=1 to N) is employed to represent "image formation apparatus 1-i".

Figure 8:
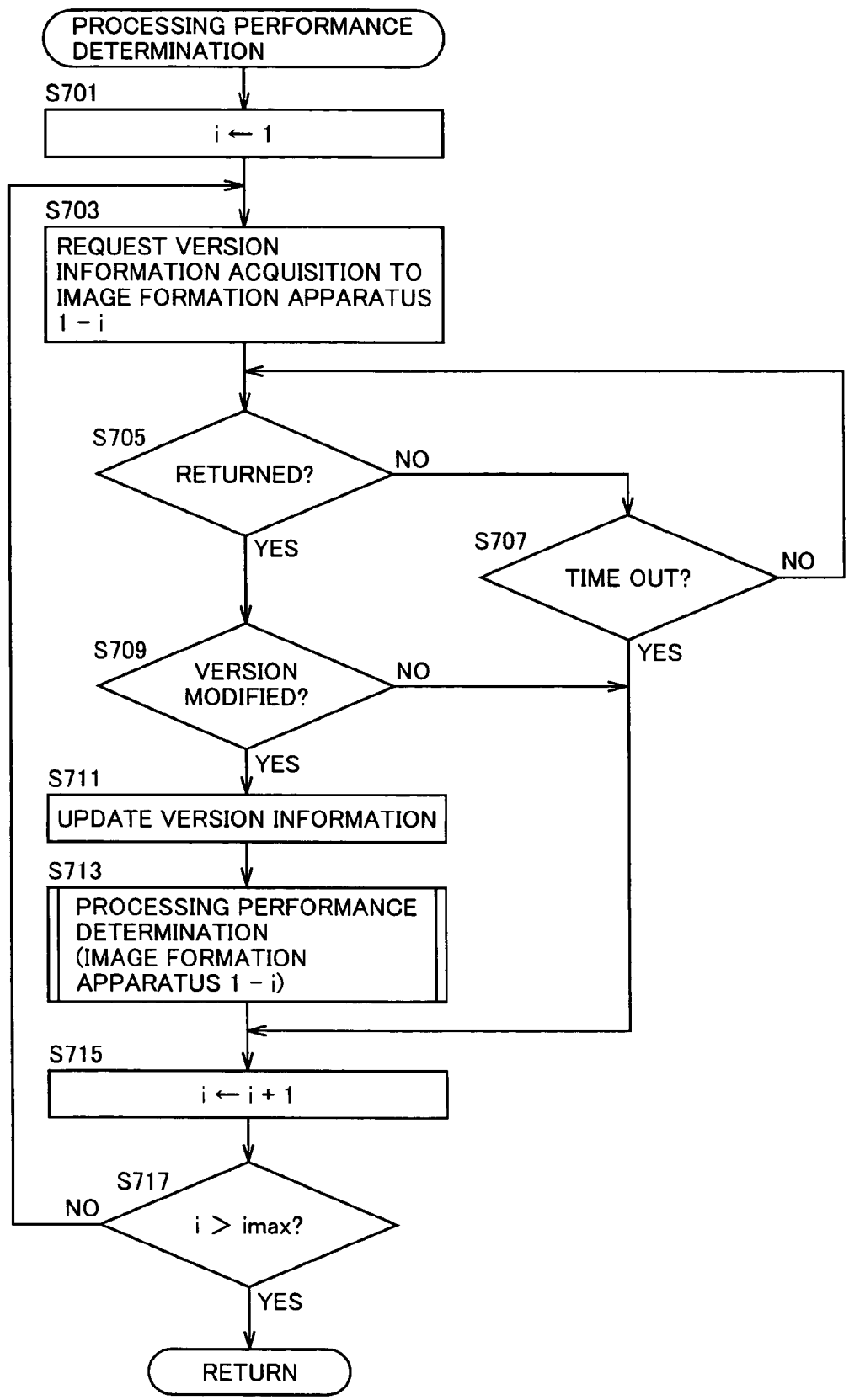
FIG. 8 is a flow chart of a subroutine of executing processing performance determination of FIG. 7.

In the processing performance determination process of FIG. 8, CPU 201 initializes variable i to 1 at step S701.

At step S703, CPU 201 transmits a firmware version acquisition request to image formation apparatus 1-i. At step S705, CPU 201 waits until there is a response from image formation apparatus 1-i. During this standby period, CPU 201 determines whether a predetermined duration of time out has elapsed or not at step S707. At elapse of the time out duration, control proceeds to step S715 to set the next image formation apparatus in the image formation system as the subject of processing.

When determination is made that information identifying the firmware version is returned from image formation apparatus 1-i prior to elapse of the time out duration, CPU 201 proceeds to S709 to determine whether the firmware version has been modified at image formation apparatus 1-i.

Information processor 2 administers the version of the firmware of each image formation apparatus in the image formation system by, for example, storing a table as represented in Table 1 (image formation apparatus table) in a fixed storage 204.

TABLE 1

Image Formation Apparatus Table

| IP Address | Printer Designation | Firmware Version |
|---|---|---|
| 192.168.1.1 | Printer A | G00-01 |
| 192.168.1.2 | Printer B | G00-23 |
| 192.168.1.3 | Printer C | G01-39 |
| . | . | . |
| . | . | . |
| . | . | . |

In the image formation apparatus table of Table 1, the IP address (Internet Protocol Address), the designation ("printer A", "printer B" . . . in Table 1), and the firmware version information ("G00-01", and the like in Table 1) are stored related to each other.

At S709, CPU 201 compares the information identifying the version received at step S705 with the version information stored in the image formation apparatus table for image formation apparatus 1-i to identify whether the version has been modified or not. When determination is made that the version has been modified, CPU 201 proceeds to S711, otherwise, control proceeds to step S715.

At step S711, CPU 201 updates the version information in the image formation apparatus table to that received from image formation apparatus 1-i at step S705. Then, control proceeds to S713.

At step S713, CPU 201 executes the process of determining the processing performance of image formation apparatus 1-i, which will be described afterwards with reference to FIG. 9. Then, control proceeds to step S715.

At step S715, CPU 201 updates variable i by adding 1, and then proceeds to step S717. At step S717, determination is made whether variable i has exceeded the maximum value (imax). When NO, control returns to step S703, otherwise, control returns to the main routine. The value of "imax" represents the number of image formation apparatuses in the image formation system. In other words, all the image formation apparatuses in the image formation system are set as the subject of processing in the processing performance determination process.

Figure 9:
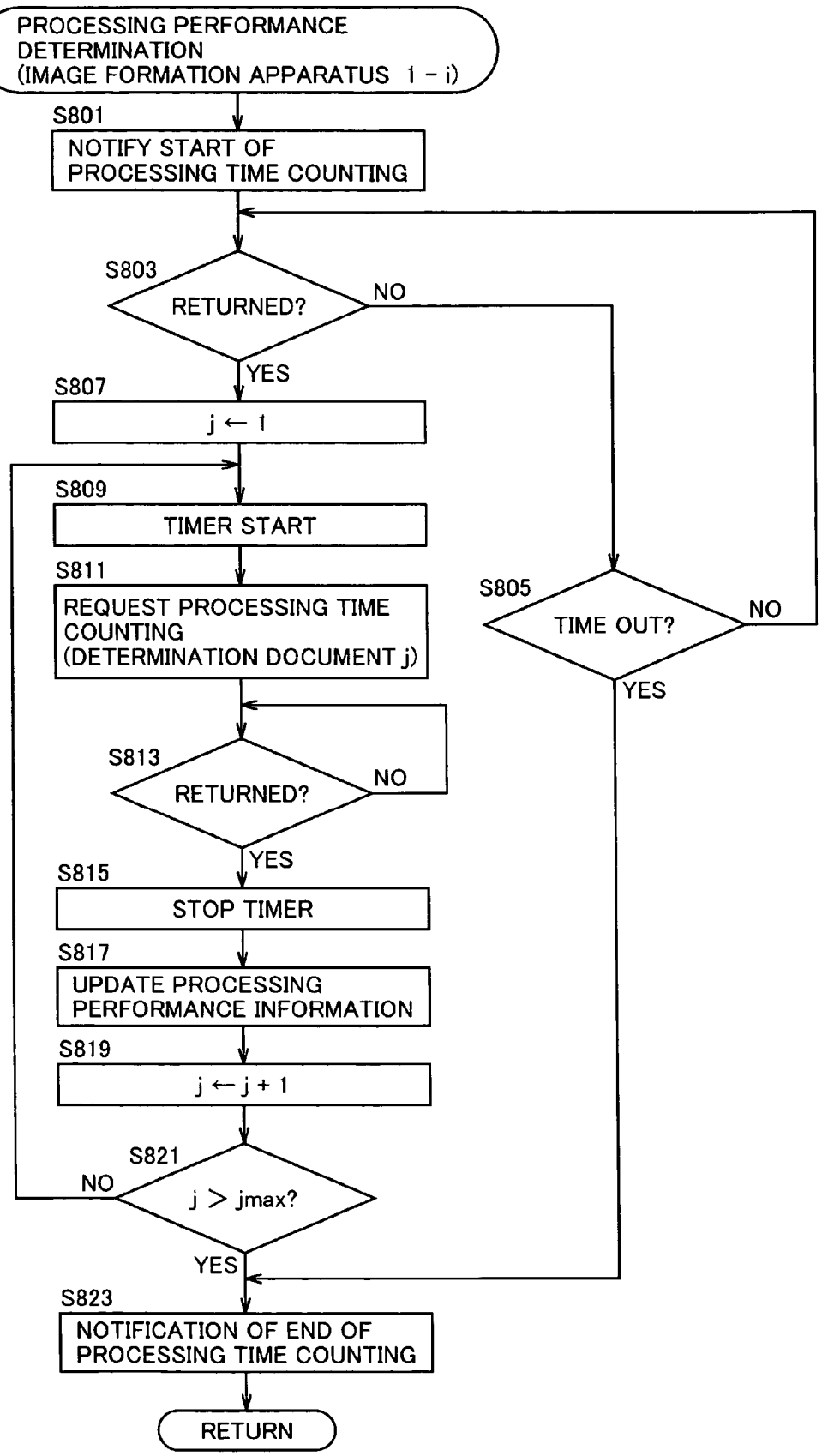
FIG. 9 is a flow chart of a subroutine for determining the processing performance of the image formation apparatus of FIG. 8.

Referring to the flow chart of FIG. 9 corresponding to a subroutine of the process of step S713 (processing performance determination process of image formation apparatus 1-i), CPU 201 transmits to image formation apparatus 1-i the information notifying initiation of processing time counting at step S801.

At step S803, CPU 201 waits for reception of a response to the notification at step S801 from image formation apparatus 1-i. During this standby, CPU 201 determines whether a predetermined time out duration has elapsed or not at step S805. When determination is made that the time out duration has elapsed, control proceeds to step S823 to inform image formation apparatus 1-i of the termination of processing time counting. Then, control returns to the subroutine of FIG. 8.

When CPU 201 receives a response prior to elapse of the time out duration, control proceeds to step S807.

At step S807, CPU 201 initializes a variable j to 1. Variable j is used in the process of FIG. 9.

At step S809, CPU 201 starts a timer 209.

At step S811, CPU 201 transmits information requesting processing time counting for a document j of determination towards image formation apparatus 1-i. This request is effected by transmitting a file for processing time counting of a document type j to image formation apparatus 1-i. When document type j corresponds to a document that is the subject of direct printing, the aforementioned file for processing time counting is as set forth below, including the relevant document (document j) and the PJL indicating the aforementioned processing time counting request:

%-12345X@PJL
@PJL SET MEASUREPROCESSTIME=ON
[Document Data]
%-12345X

Information processor 2 has a table recorded with information related to files for processing performance determination (processing performance determination document table), as shown in Table 2, in fixed storage 204.

TABLE 2

Processing Performance Determination Document Table.

| Document Format | Version | File for Determination | Threshold Value A [sec] | Threshold Value B [sec] |
|---|---|---|---|---|
| PDF | 1.3 | ts_pdf_1_3.pdf | 32.0 | 35.0 |
| PDF | 1.4 | ts_pdf_1_4.pdf | 40.0 | 45.0 |
| PDF | 1.5 | ts_pdf_1_5.pdf | 42.0 | 50.0 |

TABLE 2-continued

Processing Performance Determination Document Table.

| Document Format | Version | File for Determination | Threshold Value A [sec] | Threshold Value B [sec] |
|---|---|---|---|---|
| TIFF | 2.0 | ts_pdf_2_0.tif | 25.0 | 30.0 |
| TIFF | 2.1 | ts_pdf_2_1.tif | 25.0 | 30.0 |
| . | . | . | . | . |
| . | . | . | . | . |
| . | . | . | . | . |

Referring to Table 2, the processing performance determination document table has the label of the format of the document such as PDF, the version of the format, and the file name of a document such as "ts_pdf_1_3.pdf", and two types of threshold values (threshold value A and threshold value B in Table 2) stored in relation to each other.

In information processor 2, a processing performance information table as shown in Table 3 set forth below is stored in fixed storage 204.

TABLE 3

Processing Performance Information Table

| Document Format | Version | Image Formation Apparatus | Processing Time [sec] |
|---|---|---|---|
| PDF | 1.3 | 192.168.1.1 | 32.0 |
| PDF | 1.3 | 192.168.1.2 | 35.5 |
| PDF | 1.3 | 192.168.1.3 | 33.4 |
| PDF | 1.4 | 192.168.1.1 | 38.9 |
| PDF | 1.4 | 192.168.1.2 | 50.1 |
| PDF | 1.5 | 192.168.1.1 | 40.3 |
| TIFF | 2.0 | 192.168.1.3 | 22.1 |
| TIFF | 2.1 | 192.168.1.3 | 22.3 |
| . | . | . | . |
| . | . | . | . |
| . | . | . | . |

Referring to Table 3, the processing performance information table has the label of the document format, the version of the document format, the IP address of each image formation apparatus in the image formation system, and the processing time for each document stored in relation to each other.

Referring to FIG. 9 again, following transmission of a processing time counting request at step S811, CPU 201 waits for reception of a response from image formation apparatus 1-i that is the transmission destination at step S813. Upon receiving a response, control proceeds to step S815.

At step S815, CPU 201 stops the counting operation of timer 209 initiated at step S809.

At step S817, CPU 201 updates the stored contents of the processing performance information of image formation apparatus 1-i. Specifically, in the processing performance information table, the processing time corresponding to the format and version of document type j transmitted at step S811 and the IP address of image formation apparatus 1-i is updated to the counting time from step S809 to step S815 by timer 209. When information indicating that document type j transmitted at step S811 cannot be processed is received from image formation apparatus 1-i at step S813, CPU 201 updates the cell of the processing rate in the processing performance information table by rendering it empty.

At step S819, CPU 201 updates variable j by adding 1.

At step S821, CPU 201 determines whether variable j has exceeded the maximum value (jmax). The value of "jmax" corresponds to the number of documents stored in the processing performance determination document table. When determination is made that variable j has not exceeded jmax, CPU 201 returns to step S809, otherwise, control proceeds to step S823. At step S823, CPU 201 notifies image formation apparatus 1-i of the end of the processing time count process, and returns to the subroutine of FIG. 8.

Figure 10:
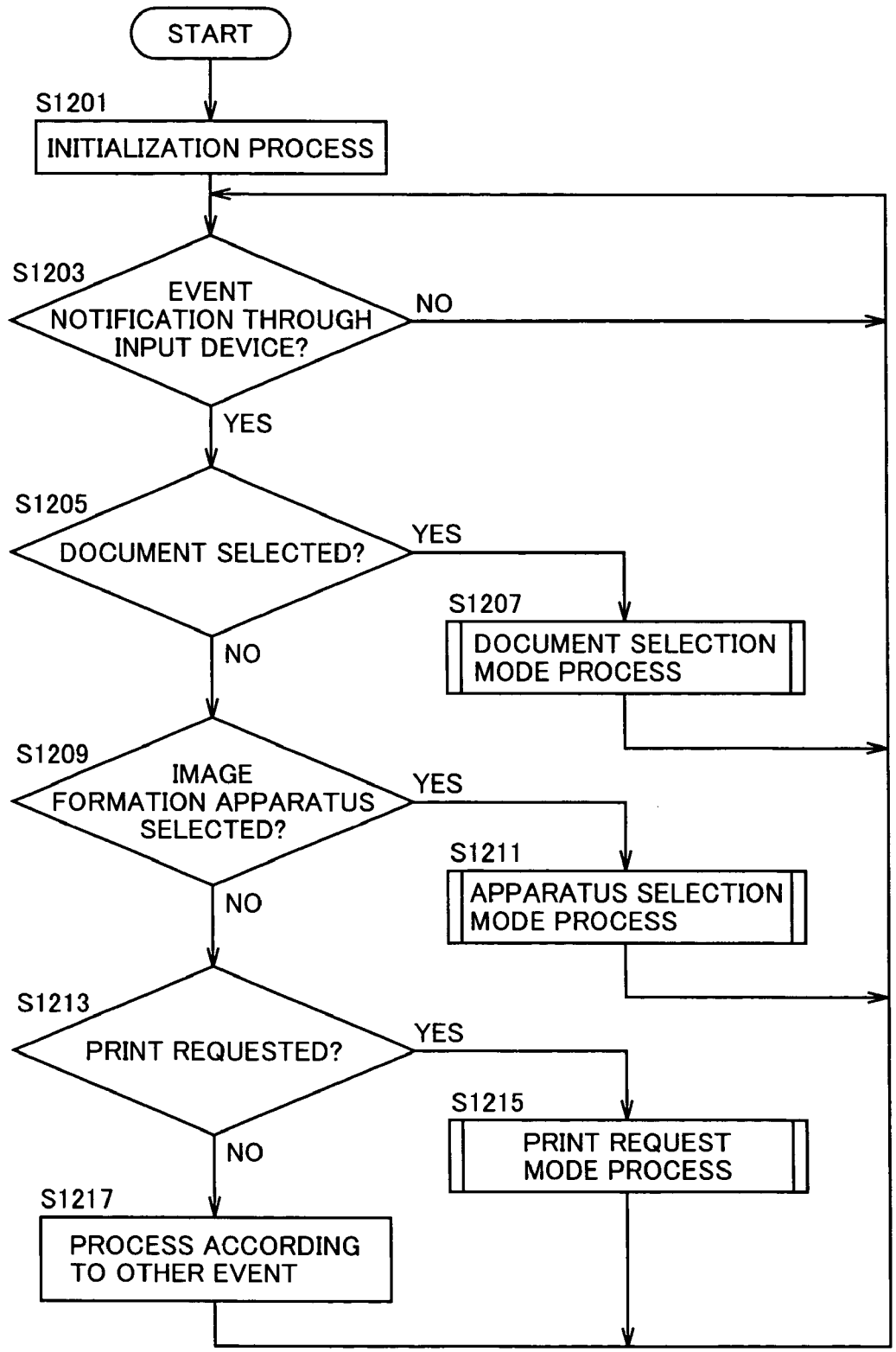
FIG. 10 is a flow chart of a main routine executed by the CPU of the information processor shown in FIG. 2B.

The process executed at information processor 3-Y in the image formation system will be described hereinafter with reference to the flow chart of FIG. 10 corresponding to the main routine executed by CPU 301 of each information processor 3-Y.

When the power of information processor 3-Y is turned on, CPU 301 executes the general initialization process such as clearing the memory, setting the standard mode and starting the operation system at step S1201.

At step S1203, CPU 301 waits until an event is generated in response to an operation through an input device (mouse 307 and keyboard 306) of information processor 3-Y. This event is generated when a document icon displayed on monitor 305, for example, is clicked with a mouse. On monitor 305, a document icon is displayed on a document file list display screen on the so-called desktop or in fixed storage 304.

At step S1205, CPU 301 determines whether a document has been selected by an operation through the input device. When YES at S1205, control proceeds to S1207, otherwise, control proceeds to step S1209.

At step S1207, CPU 301 executes a document selection mode process, which will be described afterwards with reference to FIG. 1. Then, control returns to step S1203.

At step S1209, CPU 301 determines whether an image formation apparatus has been selected or not by an operation through the input device. When YES at step S1209, control proceeds to step S1211, otherwise, control proceeds to step S1213. The operation of selecting an image formation apparatus is effected by dragging a document icon corresponding to a certain document onto the icon corresponding to the image formation apparatus.

At step S1211, CPU 301 executes an apparatus selection mode process, which will be described afterwards with reference to FIG. 12. Then, control returns to step S1203.

At step S1213, CPU 301 determines whether printing has been requested by an operation through the input device. When YES at step S1213, control proceeds to step S1215, otherwise, control proceeds to step S1217. An operation of requesting printing is effected by dragging a document icon onto the icon corresponding to the image formation apparatus.

At step S1215, CPU 301 executes a print request mode process, which will be described afterwards with reference to FIG. 13. Then, control proceeds to step S1203.

At step S1217, CPU 301 executes a process corresponding to the generated event. Then, control returns to step S1203.

Figure 11:
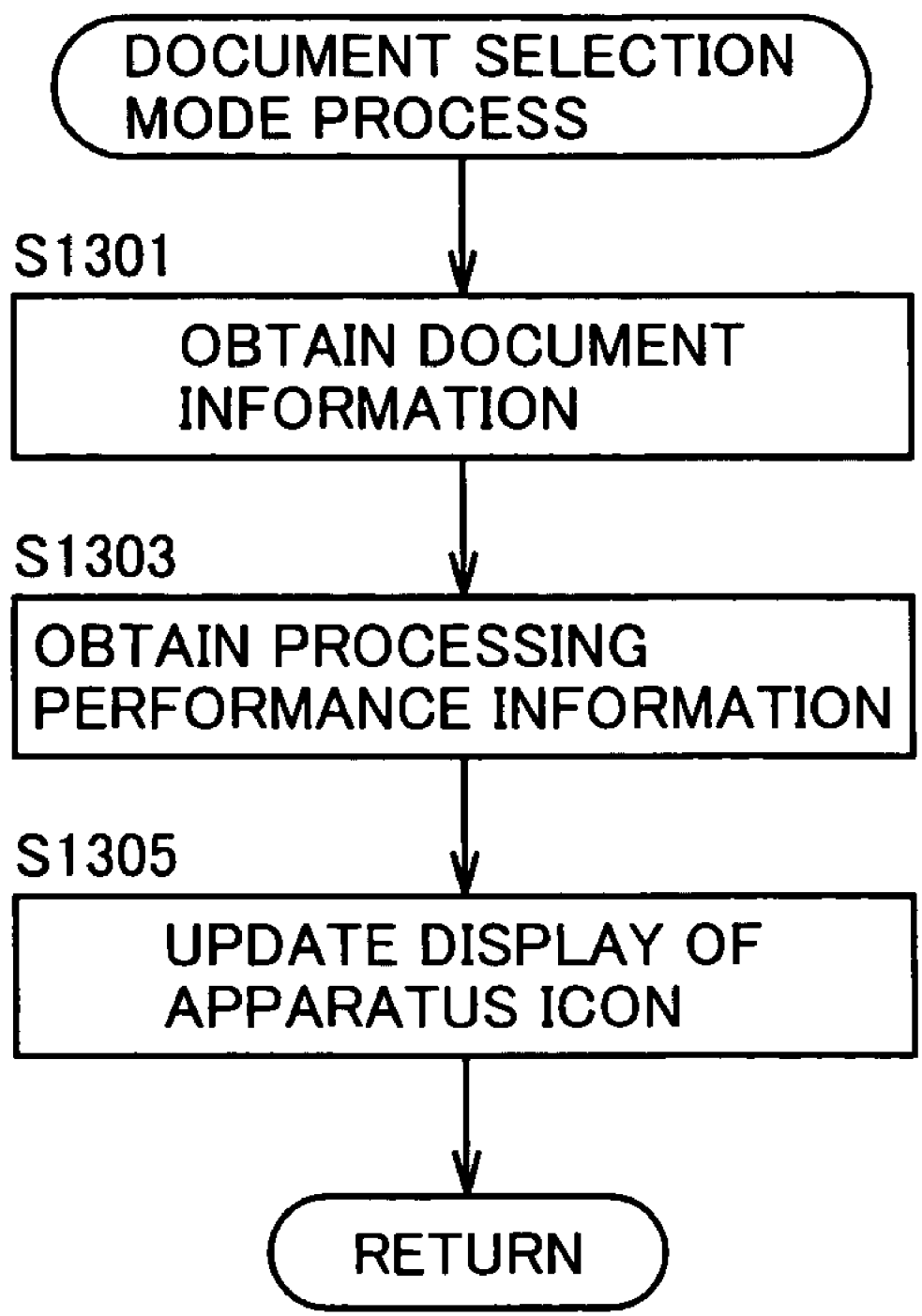
FIG. 11 is a flow chart of a subroutine of a document selection mode process of FIG. 10.

Referring to the flow chart of FIG. 11 corresponding to the subroutine of the document selection mode process of step S1207, CPU 301 obtains information on the selected document at step S1301. Information obtained at this stage includes the document format and version. The document format is obtained from the file extension of each document, whereas the format version is obtained based on the information written in the relevant document file in a manner predetermined for each document format.

At step S1303, CPU 301 obtains the processing performance information on the format and version of the document obtained at step S1301. Specifically, CPU 301 refers to the processing performance information table to obtain the processing rate of each image formation apparatus 1-X for the format and version obtained at step S1301. Fixed storage 304 of information processor 3-Y stores a processing performance information table, likewise fixed storage 204 in information processor 2. The processing performance information table in fixed storage 304 is a duplication of the table stored in fixed storage 204, obtained by an access to information processor 2 by CPU 301. This duplication may be made every time the processing performance information table in fixed storage 204 is updated, or for every predetermined time.

Upon obtaining the processing performance information at step S1303, CPU 301 notifies the user of the obtained processing performance information by providing a display thereof on monitor 305 or the like at step S1305. Then, control returns to step S1207. In information processor 3-Y, the icon for each image formation apparatus 1-X is displayed on monitor 305. The displayed manner of an icon corresponding to each image formation apparatus is modified based on the relationship of the processing rate (processing performance) on the currently obtained format with threshold values A and B. For example, when the processing performance exceeds threshold value A, the icon of the corresponding image formation apparatus is displayed in blue. When the processing performance is lower than threshold value A but higher than threshold value B, the icon of the corresponding image formation apparatus is displayed in gray. When the performance is lower than both threshold values A and B, the icon of the corresponding image formation apparatus is displayed in red. The processing performance being "higher than threshold value A" refers to the case where the number of seconds obtained as the processing rate is smaller than the value stored as threshold value A. Accordingly, when a document is selected, the difference in performance of each image formation apparatus when that document is to be processed can be represented in a visual manner at information processor 3-Y. Therefore, the user can readily recognize the performance of each image formation apparatus for a selected document.

The displayed manner of the icon is not restricted to the color, and various forms can be selected. For example, the size or gray scale level of the icon may be modified based on the relationship of the processing performance with threshold value A and threshold value B. Further, a frame can be set around the icon, and modify the thickness, color, and/or gray scale level of the frame. Additionally, characters corresponding to the performance information can be displayed on the icon.

Fixed storage 304 of information processor 3-Y stores a processing performance determination document table, likewise fixed storage 204 in information processor 2. The processing performance determination document table in fixed storage 304 is a duplication of the table stored in fixed storage 204, obtained by an access to information processor 2 by CPU 301. This duplication may be made every time the table in fixed storage 204 is updated and modified, or for every predetermined time. CPU 301 reads out the threshold values A and B for the format and version that is the subject of processing, based on the processing performance determination document table in fixed storage 304 and utilizes the same appropriately in the process.

Figure 12:
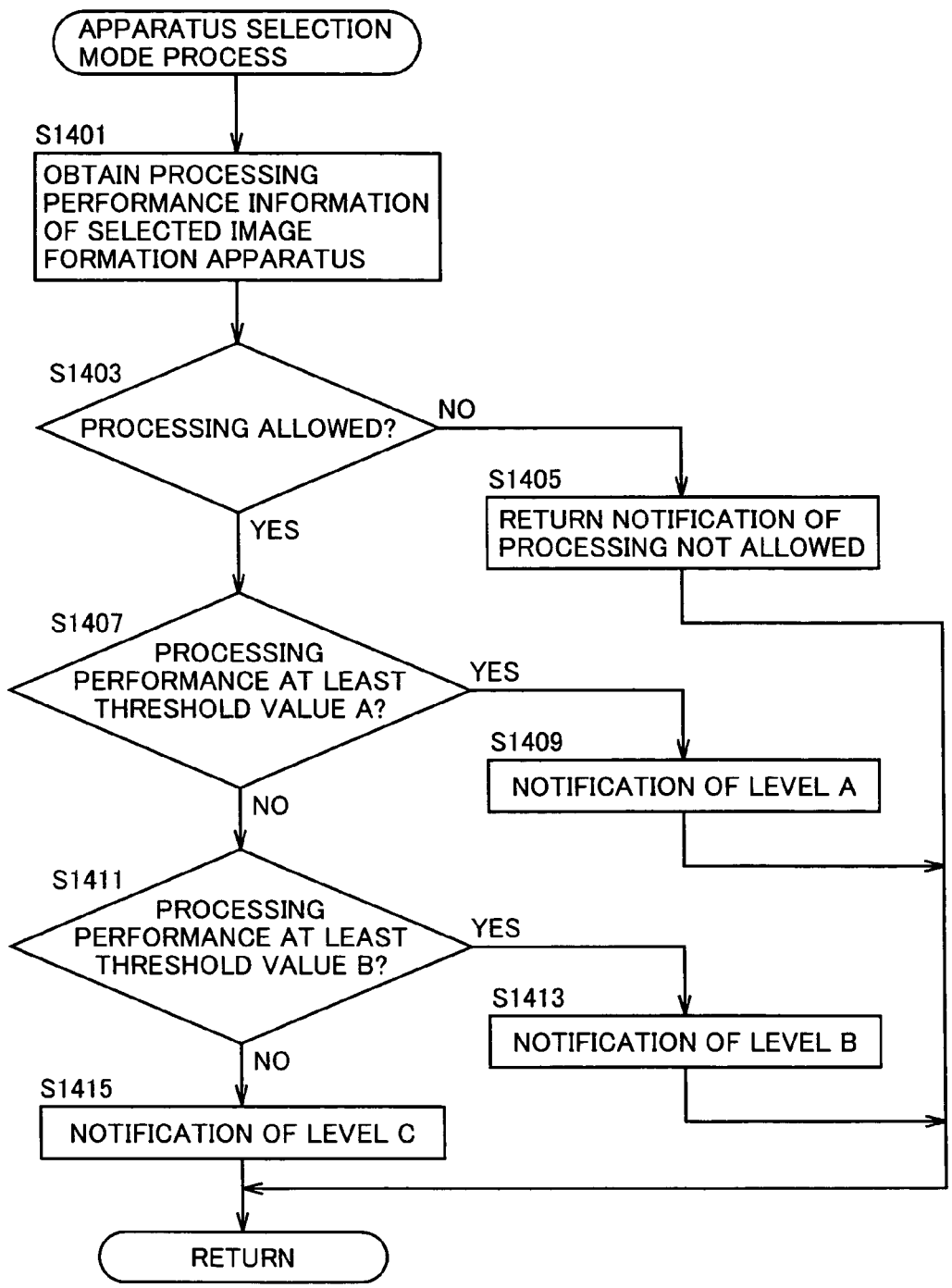
FIG. 12 is a flow chart of a subroutine of an apparatus selection mode process of FIG. 10.

Referring to the flow chart of FIG. 12 corresponding to a subroutine of the apparatus selection mode process of step S1211, CPU 301 obtains the processing performance information on the selected image formation apparatus at step S1401. At this stage, CPU 301 refers to the processing performance information table to obtain the processing rate of the image formation apparatus and document (corresponding to the corresponding format and version) that is the subject of dragging operation, described in the process of step S1209.

At step S1403, CPU 301 determines whether the selected image formation apparatus can process the selected document. Specifically, when a value is stored in the cell corresponding to the processing rate that is the subject of acquisition at step S1401 in the processing performance information table, determination is made that the selected document can be processed. When this cell is empty, determination is made that the selected document cannot be processed. When determination is made that processing is allowed, control proceeds to step S1407, otherwise, control proceeds to step S1405. At step S1405, the user is notified that processing is not allowed. Then, control returns to step S1211. This notification is effected by reproducing a corresponding sound file (represented as sound file Z), or rendering a vibrating mouse 307 in a predetermined amplitude (represented as amplitude Z).

At step S1407, CPU 301 determines whether the processing performance is at least threshold value A. When YES, control proceeds to step S1409 to notify the user accordingly. Then, control returns to the main routine. When determination is made that the processing performance is lower than threshold value A (that is, the number of seconds representing the processing rate exceeds the value stored as threshold value A), CPU 301 proceeds to step S1411.

Notification at step S1409 includes, for example, reproduction of a corresponding sound file (represented as sound file A), or a vibrating mouse 307 in a predetermined amplitude (represented as amplitude A). Alternatively, notification can be made that the currently selected image formation apparatus is suitable for processing the currently selected document by suppressing reproduction of a sound file or vibrating mouse.

At step S1411, CPU 301 determines whether the processing performance is at least threshold value B. When YES, control proceeds to step S1413 to inform the user accordingly. Then, the control proceeds to step S1211. When determination is made that the processing performance is below threshold value B, CPU 301 proceeds to step S1415 to notify the user accordingly. Then, control returns to step S1211.

Notification at step S1413 includes, for example, reproducing a corresponding sound file (represented as sound file B), or rendering a vibrating mouse 307 in a predetermined amplitude (represented as amplitude B). Accordingly, the user is notified that the selected image formation apparatus is not necessarily suitable for processing the selected document, and attention must be given.

The notification at step S1415 includes, for example, reproducing a corresponding sound file (represented as sound file C), or rendering a vibrating mouse 307 in a predetermined amplitude (represented as amplitude C). Accordingly, the user is notified of the selected image formation apparatus being capable of processing the selected document, but processing by another image formation apparatus is recommended.

Sound files Z, A, B, C as well as amplitudes Z, A, B, and C differ from each other. The user can recognize the performance of the image formation apparatus depending upon at what sound and what amplitude the notification has been made. Further, notification is not limited to sound or vibration, and can be effected by various ways such as the displayed manner of the icon.

In the present specification, the level corresponding to the relationship with a threshold value is provided for the processing performance. Specifically, the processing performance is set as level A when equal to or higher than threshold value A, set to level B when at least threshold value B and less than threshold value A, and set to level C when below threshold value B.

Figure 13:
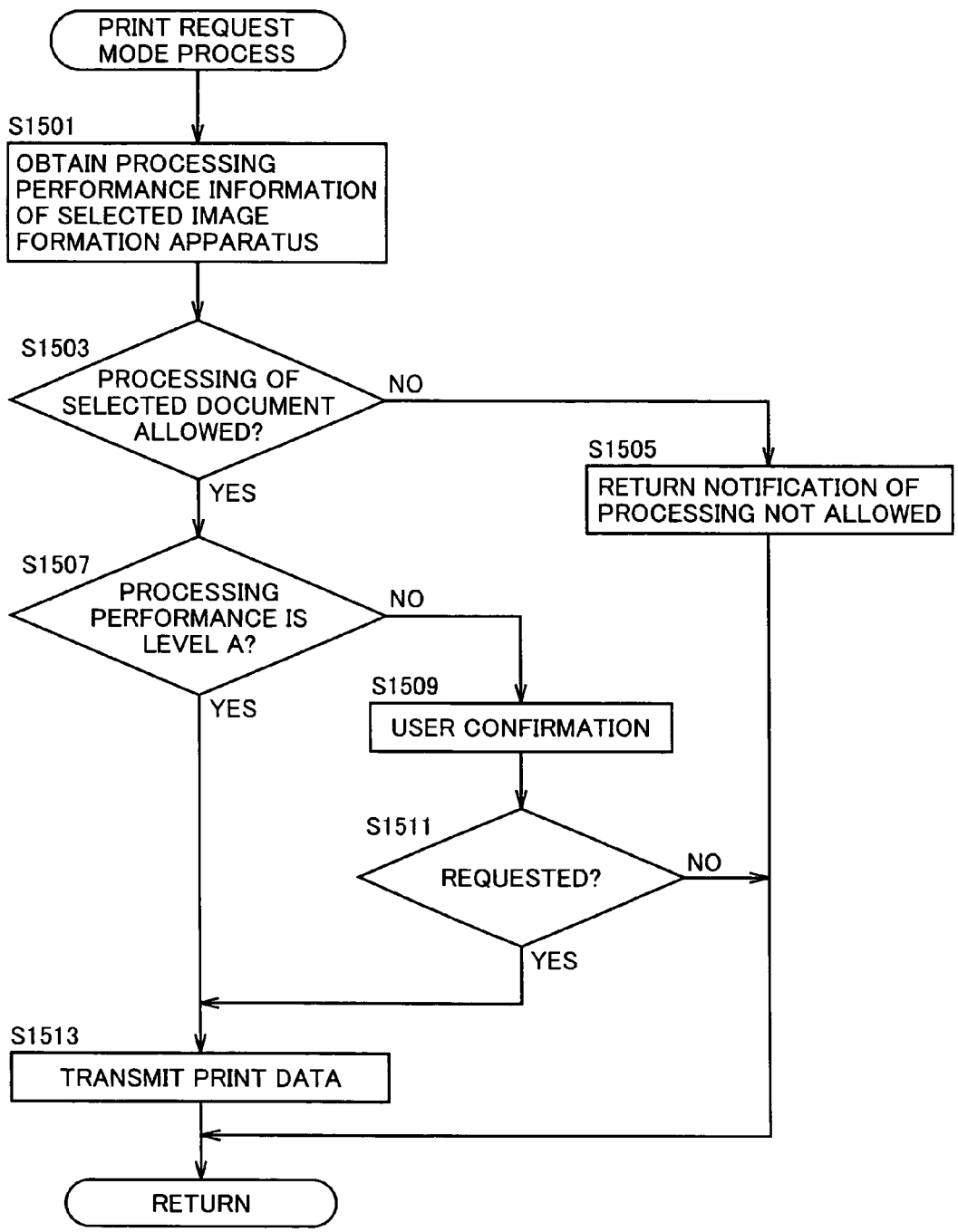
FIG. 13 is a flow chart of a subroutine of a print request process mode of FIG. 10.

Referring to the flow chart of FIG. 13 corresponding to a subroutine of the print request mode process of step S1215 (refer to FIG. 10), CPU 301 obtains the processing performance information on the selected image formation apparatus at step S1501, likewise step S1401 (refer to FIG. 12).

At step S1503, CPU 301 determines whether the selected image formation apparatus can process the selected document, likewise step S1403 (refer to FIG. 12). When determination is made that processing is allowed, CPU 301 proceeds to step S1507, otherwise, proceeds to step S1505. At step S1505, CPU 301 notifies the user accordingly, and returns to the main routine.

The notification of step S1505 includes, for example, an animation display of the document icon dropped on the apparatus icon being flipped out by the relevant apparatus icon, or a display of a message warning that the selected image formation apparatus cannot process (print out) the selected document.

At step S1507, CPU 301 refers to the processing performance determination document table and processing performance information table to determine whether the processing performance of the selected image formation apparatus with respect to the selected document is level A or not. When determination is made that the performance corresponds to level A, control proceeds to step S1513, otherwise, control proceeds to step S1509.

At step S1509, CPU 301 sends a notification to the user to confirm whether the selected document is to be printed out by the selected image formation apparatus. Then, control proceeds to step S1511.

At step S1511, CPU 301 waits for input of information from the user through the input device. Specifically, CPU 301 waits for entry of information requesting a print out operation of the selected document by the selected image formation apparatus, or not requesting a print out operation of the selected document by the selected image formation apparatus. When determination is made of an input of the former information, control proceeds to step S1513. When determination is made of an input of the latter information, CPU 301 returns to the main routine.

At S1513, CPU 301 transmits the print data of the selected document to the selected image formation apparatus. Then, CPU 301 causes the relevant image formation apparatus to conduct the printing process of the relevant document. Then, control returns to the main routine.

The present embodiment was described in which information processor 2 and information processor 3-Y differ from each other. However, information processor 2 and information processor 3-Y may be the same such that the process described with reference to FIGS. 7-9 and the process described with reference to FIGS. 10-13 are executed by the same information processor.

In the above-described embodiment, the process described with reference to FIGS. 7-9 and FIGS. 10-13 are realized by execution of the programs stored in fixed storages 204 and 304 or ROMs 203 and 303 by CPU 201 and CPU 301. As described with reference to FIGS. 2A and 2B, information processor 2 and information processor 3-Y include medium drives 210 and 310, respectively, that can read and write information with respect to an external recording medium such as a CD-ROM (Compact Disk Read Only Memory). The process described with reference to FIGS. 7-9 and the process described with reference to FIGS. 10-13 can be realized by execution of the programs stored in external recording mediums 2000 and 3000, respectively, by CPU 201 and CPU 301, utilizing media drives 210 and 310, respectively.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation system comprising:
   a plurality of image formation apparatuses, and at least one information processor, connected to one another,
   said information processor including
   a performance information storage unit configured to store, for each type of document, performance information related to processing rate of each said image formation apparatus to process a document,
   an input unit functioning as a pointing device,
   a display unit configured to display apparatus icons, each apparatus icon corresponding to an image formation apparatus from the plurality of image formation apparatuses, and a document icon corresponding to a document,
   a document selection unit configured to select a document, of which direct print processing by any one of said image formation apparatuses is to be requested, by selecting the document icon corresponding to the document through said input unit,
   a detection unit configured to detect a type of document selected by said document selection unit,
   a performance information acquisition unit configured to obtain performance information related to processing rate of each image formation apparatus stored in said performance information storage unit for the type of document detected by said detection unit,
   and
   a notification unit configured to provide a first notification to a user when the document icon is selected by said document selection unit to select the document, of the performance information of each image formation apparatus, for the type of the selected document, by changing said displayed apparatus icons in a respective manner corresponding to the performance information of each image formation apparatus for the type of the selected document.

2. The image formation system according to claim 1, said information processor further including an apparatus selection unit selecting an image formation apparatus from the plurality of image formation apparatuses to process the document selected by said document selection unit,
   wherein said notification unit provides a second notification to the user, when the image formation apparatus is selected to process the selected document, of the performance information of the selected image formation apparatus for the type of the selected document.

3. The image formation system according to claim 2, wherein
   said apparatus selection unit selects said image formation apparatus to process the selected document by dragging the document icon corresponding to said selected document onto an apparatus icon corresponding to said selected image formation apparatus by said input unit,
   said notification unit provides said second notification to the user, when the document icon corresponding to said selected document is dragged on the apparatus icon corresponding to said image formation apparatus by said input unit, the performance information of said image formation apparatus corresponding to said dragged apparatus icon for the type of the selected document.

4. The image formation system according to claim 3, wherein said notification unit provides said second notification by vibrating said input unit in an amplitude corresponding to the performance information of said image formation apparatus corresponding to said dragged apparatus icon for the type of the selected document.

5. The image formation system according to claim 3, wherein said notification unit provides said second notification by sound corresponding to the performance information of said image formation apparatus corresponding to said dragged apparatus icon for the type of selected document.

6. The image formation system according to claim 1, wherein said type of document includes the type of a file format of a document.

7. The image formation system according to claim 1, wherein said type of document includes a version of a file format of a document.

8. The image formation system according to claim 1, said image formation apparatus including an execution unit receiving print data identified as data to process a document from said information processor, virtually executing processing of said received print data, and transmitting end information indicating an end of said virtual processing, when ended, to said information processor,
   said information processor further including a counting unit counting a time starting from transmission of said print data to said image formation apparatus until reception of said end information,
   wherein said performance information storage unit stores at least a time counted by said counting unit as said performance information.

9. The image formation system according to claim 8, said information processor further including
   a version information acquisition unit obtaining, from said image formation apparatus, information to identify a version of a program directed to controlling said image formation apparatus, and
   a version information storage unit storing a version of a program directed to controlling said image formation apparatus,
   wherein said counting unit counts said time when the version identified by the information obtained by said version information acquisition unit differs from the version stored in said version information storage unit.

10. An information processor connected to a plurality of image formation apparatuses, said information processor comprising:
    a performance information storage unit configured to store, for each type of document, performance information related to processing rate of each said image formation apparatus to process a document,
    an input unit functioning as a pointing device,
    a display unit configured to display apparatus icons, each apparatus icon corresponding to an image formation apparatus from the plurality of image formation apparatuses, and a document icon corresponding to a document,
    a document selection unit configured to select a document, of which direct print processing by any one of said image formation apparatuses is to be requested, by selecting the document icon corresponding to the document through said input unit,
    a detection unit configured to detect a type of document selected by said document selection unit,
    a performance information acquisition unit configured to performance information related to processing rate of each image formation apparatus stored in said performance information storage unit for the type of document detected by said detection unit,
    a notification unit configured to provide a first notification to a user when the document icon is selected by said document selection unit to select the document, of the performance information of each image formation apparatus for the type of the selected document by changing said displayed apparatus icons in a respective manner corresponding to the performance information of each image formation apparatus for the type of the selected document.

11. The information processor according to claim 10, further including an apparatus selection unit selecting an image formation apparatus to process the document selected by said document selection unit,
    wherein said notification unit provides a second notification to the user, when the image formation is selected to process the selected document, of the performance information of the selected image formation apparatus for the type of the selected document.

12. The information processor according to claim 11, wherein
    said apparatus selection unit selects said image formation apparatus to process the selected document by dragging the document icon corresponding to said selected document onto an apparatus icon corresponding to said selected image formation apparatus by said input unit,
    said notification unit provides said second notification to the user, when the document icon corresponding to said selected document is dragged on the apparatus icon corresponding to said image formation apparatus by said input unit, the performance information of said selected image formation apparatus corresponding to said dragged apparatus icon for the type of the selected document.

13. The information processor according to claim 12, wherein said notification unit provides said second notification by vibrating said input unit in an amplitude corresponding to the performance information of said selected image formation apparatus corresponding to said dragged apparatus icon for the type of the selected document.

14. The information processor according to claim 12, wherein said notification unit provides said second notification by sound corresponding to the performance information of said selected image formation apparatus corresponding to said dragged apparatus icon for the type of selected document.

15. The information processor according to claim 10, wherein said type of document includes the type of a file format of a document.

16. A non-transitory computer-readable recording medium recorded with a control program to control an information processor connected to a plurality of image formation apparatuses, causing said information processor to execute the steps of:
    selecting a document of which direct print processing by any one of said image formation apparatuses is to be requested, by selecting a document icon corresponding to the document through an input unit functioning as a pointing device,
    detecting a type of said selected document,
    obtaining performance information related to processing rate of each image formation apparatus stored in a performance information storage unit storing, for each type of document, performance information related to processing rate of each said image formation apparatus to process a document, for the type of document detected, and providing a first notification to a user when the document icon is selected, of said obtained performance information of each image formation apparatus for the type of the selected document by changing said displayed apparatus icons in a respective manner corresponding to the performance information of each image formation apparatus for the type of the selected document.

* * * * *